(12) United States Patent
Fuoc

(10) Patent No.: US 11,248,711 B2
(45) Date of Patent: Feb. 15, 2022

(54) SHUT-OFF DEVICE COMPRISING A SEALING DEVICE

(71) Applicant: XOMOX International GmbH & Co. OHG, Lindau (DE)

(72) Inventor: Alain Fuoc, Illzach (FR)

(73) Assignee: XOMOX International GmbH & Co. OHG, Lindau (DE)

( * ) Notice: Subject to any disclaimer, the term of this patent is extended or adjusted under 35 U.S.C. 154(b) by 196 days.

(21) Appl. No.: 16/633,415

(22) PCT Filed: May 16, 2018

(86) PCT No.: PCT/EP2018/062769
§ 371 (c)(1),
(2) Date: Jan. 23, 2020

(87) PCT Pub. No.: WO2019/025045
PCT Pub. Date: Feb. 7, 2019

(65) Prior Publication Data
US 2020/0370660 A1 Nov. 26, 2020

(30) Foreign Application Priority Data

Jul. 31, 2017 (DE) ...................... 10 2017 117 330.7
Sep. 5, 2017 (DE) ...................... 10 2017 120 389.3

(51) Int. Cl.
*F16K 5/02* (2006.01)
*F16K 41/02* (2006.01)
(Continued)

(52) U.S. Cl.
CPC ............. *F16K 5/0285* (2013.01); *F16K 5/02* (2013.01); *F16K 5/0485* (2013.01); *F16K 41/00* (2013.01); *F16K 41/02* (2013.01); *F16K 41/026* (2013.01)

(58) Field of Classification Search
CPC ........ F16K 5/0285; F16K 41/026; F16K 5/02; F16K 41/00; F16K 41/02; F16K 5/0485
(Continued)

(56) References Cited

U.S. PATENT DOCUMENTS 2,229,120 A * 1/1941 Nordstrom .............. F16K 5/166
137/246.19
3,371,676 A 3/1968 Mullaney, III
(Continued)

FOREIGN PATENT DOCUMENTS

CA 1156637 A 11/1983
CN 1341200 A 3/2002
(Continued)

OTHER PUBLICATIONS

Bunko of Peking University, Serving Refineries Around the World, Flowserve, Bulletin V-25m (E), Printed Oct. 2002, 9 pages.
(Continued)

*Primary Examiner* — John Bastianelli
(74) *Attorney, Agent, or Firm* — Collard & Roe, P.C.

(57) ABSTRACT

A valve includes a housing and a rotary body arranged notably therein with a through opening for a fluid, wherein a flow path is shut off or is at least partially opened in accordance with the rotational angle position of the rotary body about an axis of rotation, wherein the rotary body is connected to a spindle by which the rotary body is rotatable, wherein the housing is provided with a covering, and wherein the spindle reaches through the covering. The spindle is dynamically sealed by a sealing device which follows movements of the spindle relative to the housing and/or to the covering.

10 Claims, 6 Drawing Sheets

(51) Int. Cl.
*F16K 5/04* (2006.01)
*F16K 41/00* (2006.01)

(58) Field of Classification Search
USPC .................................... 251/214, 304–317.01
See application file for complete search history.

(56) References Cited

U.S. PATENT DOCUMENTS

| | | | | |
|---|---|---|---|---|
| 3,991,974 | A | * | 11/1976 | Bonafous .............. F16K 1/2265 251/306 |
| 4,159,818 | A | | 7/1979 | Hoos |
| 4,510,966 | A | * | 4/1985 | Parsons, Jr. ............. F16K 5/166 137/375 |
| 4,535,803 | A | * | 8/1985 | Price ..................... F16K 5/0285 137/375 |
| 5,024,453 | A | * | 6/1991 | Suggs ..................... E21B 33/08 277/523 |
| 5,044,606 | A | * | 9/1991 | Wordin ................. F16K 41/026 277/522 |
| 5,056,758 | A | * | 10/1991 | Bramblet .............. F16K 41/046 251/214 |
| 5,064,167 | A | | 11/1991 | Dipalma |
| 5,129,625 | A | * | 7/1992 | Wood ..................... F16J 15/186 251/214 |
| 5,131,666 | A | | 7/1992 | Hutchens |
| 5,326,074 | A | * | 7/1994 | Spock, Jr ............. F16K 41/046 251/214 |
| 5,402,983 | A | * | 4/1995 | Bernhardt ............. F16K 5/0285 251/214 |
| 5,577,709 | A | | 11/1996 | Gugala et al. |
| 6,622,987 | B2 | * | 9/2003 | Sterud ..................... F16K 41/02 251/214 |
| 6,640,823 | B2 | | 11/2003 | Gonsior |
| 7,048,254 | B2 | * | 5/2006 | Laurent .................. F16K 41/02 251/214 |
| 10,060,553 | B2 | | 8/2018 | Hotz et al. |
| 2002/0046768 | A1 | | 4/2002 | Gonsior |
| 2013/0270472 | A1 | | 10/2013 | Crochet, Sr. et al. |

FOREIGN PATENT DOCUMENTS

| | | |
|---|---|---|
| CN | 103574078 A | 2/2014 |
| CN | 106170650 A | 11/2016 |
| DE | 809 876 C | 8/1951 |
| DE | 44 04 919 A1 | 8/1995 |
| DE | 696 18 803 T2 | 9/2002 |
| DE | 698 18 097 T2 | 7/2004 |
| DE | 20 2004 019 228 U1 | 2/2005 |
| DE | 10 2006 022 212 A1 | 11/2007 |
| EP | 0 227 474 A2 | 1/1987 |
| JP | S62-242181 A | 10/1987 |
| KR | 10-2015-0000506 A | 1/2015 |
| WO | 99/31412 A1 | 6/1999 |

OTHER PUBLICATIONS

Chinese Search Report in CN 2018800479953, dated May 28, 2021.
International Search Report in PCT/EP2018/062769, dated Aug. 22, 2018.
German Search Report in DE 10 2017 120 389.3, dated Jun. 21, 2018 with English translation of relevant parts.
Protest Submissions with Schedules A and B dated Apr. 20, 2021 in connection with Canadian Patent Application No. 3066195.
Affidavit of Keith Walker with exhibits appended thereto dated Mar. 18, 2021 in support of Protest Submissions in connection with Canadian Patent Application No. 3066195.
Exhibit A referred to in the Affidavit of Keith Walker—Marketing Brochure Durco Sleeveline G4 Plug Valve, bulletin V24 (E) dated Jan. 1998.
Exhibit B referred to in the Affidavit of Keith Walker—Flowserve drawing CP008402-003-R1 dated Oct. 25, 2011, revised Mar. 1, 2012.
Exhibit C referred to in the Affidavit of Keith Walker—Flowserve drawing BY86164A-R14 dated 2011, revised Jan. 5, 2020.
Exhibit D referred to in the Affidavit of Keith Walker—Marketing Brochure Durco HF Alkylation Valve, bulletin V25m (E) dated Oct. 2002.
Exhibit E referred to in the Affidavit of Keith Walker—Marketing Release document dated Feb. 21, 2017.
Exhibit F referred to in the Affidavit of Keith Walker—2" T4EB Marathon cross-sectional drawing 1N21900 dated Feb. 2, 2012.
Exhibit G referred to in the Affidavit of Keith Walker—Thrust Collar drawing 4N22396 dated May 6, 2013.
Exhibit H referred to in the Affidavit of Keith Walker—Drawing 3N21898 dated Feb. 2, 2012.
Exhibit I referred to in the Affidavit of Keith Walker—Drawing BY90982A dated Jun. 30, 2003, revised Mar. 12, 2014.
Exhibit J referred to in the Affidavit of Keith Walker—Order No. 1159946 dated Apr. 30, 2014.
Exhibit K referred to in the Affidavit of Keith Walker—Order No. 1170539 dated Jan. 22, 2015.
Exhibit L referred to in the Affidavit of Keith Walker—Order No. 1191372 dated Jul. 12, 2016.
Exhibit M referred to in the Affidavit of Keith Walker—Bill of Lading dated Dec. 7, 2016 respecting first shipment of Order 1191732, with attached delivery confirmation on Dec. 13, 2016, and, Bill of Lading dated Nov. 9, 2016 respecting first shipment of Order 1191372, with attached delivery confirmation on Nov. 15, 2016.
Exhibit N referred to in the Affidavit of Keith Walker—Order No. 1193711 dated Sep. 12, 2016.
Exhibit O referred to in the Affidavit of Keith Walker—Order No. 1724346 dated Feb. 27, 2015.
Exhibit P referred to in the Affidavit of Keith Walker—Order No. 1730683 dated May 31, 2017.
English translation of the Written Opinion of the International Searching Authority in PCT/EP2018/062769, dated Aug. 22, 2018.
Notice of Opposition in MX/a/2019/014638 dated Oct. 19, 2020.
Opposition in MX/a/2019/014638 dated Oct. 13, 2020 with attachments and translation of Opposer's observations.

* cited by examiner

SHUT-OFF DEVICE COMPRISING A SEALING DEVICE

CROSS REFERENCE TO RELATED APPLICATIONS

This application is the National Stage of PCT/EP2018/062769 filed on May 16, 2018, which claims priority under 35 U.S.C. § 119 of German Application Nos. 10 2017 117 330.7 filed on Jul. 31, 2017 and 10 2017 120 389.3 filed on Sep. 5, 2017, the disclosures of which are incorporated by reference. The international application under PCT article 21(2) was not published in English.

BACKGROUND OF THE INVENTION

1. Field of the Invention

The invention concerns a valve.

2. Description of the Related Art

A tap cock with a conical plug is already known from DE 20 2004 019 228 U1. This discloses a tap cock, the plug of which is received in a housing. The plug is an element which is arranged in the housing so as to be rotatable about its axis, with a passage opening for a fluid. Such an element is referred to below as a conical rotary body.

Depending on the rotational angular position of the conical rotary body about its rotation axis, a flow path is either completely shut off or at least partially opened. The conical rotary body carries a spindle by means of which the conical rotary body can be actuated or rotated. The valve is provided with a cover. The spindle is sealed against the cover by a gland seal.

In this context, valves are known in which a sealing device is arranged in a cover, wherein the sealing device is in contact with the surface of the conical rotary body.

When a cover is fixedly connected to the static housing of a valve with a conical rotary body, it cannot follow any lateral movements of a spindle. As a result, uncontrolled, escaping emissions are provoked.

This is the case in particular if unintentional lateral movements occurring along the spindle are initiated unfavorably.

Such movements become evident in the part of the surface of the sealing device which is unloaded during a temporary condition.

Due to undesirable lateral movements of the spindle, namely a sealing device may be loaded in one direction and unloaded in another. Leakages can occur at least on the unloaded side.

As a result, hazardous media, in particular liquids but also gases or solids, can spread into the environment. The media may also cause irreparable changes to surfaces exposed to the media. Also, there may be risks to humans and animals or the environment if media escape undesirably.

SUMMARY OF THE INVENTION

The invention is therefore based on the object of specifying a valve which has a permanently high operating suitability even under undesirable force loading.

The above-mentioned object is achieved with the features according to the invention.

According to this, the spindle is dynamically sealed by a sealing device which, at least in regions or portions, follows movements of the spindle relative to the housing and/or to the cover.

The sealing device may provide a seal independently of or decoupled from any movements of the spindle relative to the cover.

The sealing device follows the spindle without losing its sealing contact on the circumferential face of the spindle. The sealing device in particular follows tilting movements, but not rotary movements of the spindle, in regions or portions.

According to the invention, the sealing device moves, at least partially, with the spindle or the rotary body of the valve as strictly as possible. According to the invention, this takes place as far as possible without any adverse influence from fixed components.

According to the invention, it was found firstly that, in order to be able to fulfil its function in the long-term, it is absolutely necessary for a sealing device of a spindle not to be exposed to any pressure loading and/or lateral pressure unloading as far as possible.

According to the invention, it has also been found that sealing components should be exposed to a sustained and uninterrupted sealing pressure without this being influenced by forces exerted by the sealing device inwardly onto the spindle or other surfaces of the rotary body.

These peripheral conditions, established in inventive fashion, are fulfilled according to the invention by a suitable kinematic of the assembled components of the sealing device.

In concrete terms, in a sealing device according to the invention, defined sealing components are exposed to a homogenous loading by a spring play, wherein the spring play acts locally, independently of the position of the rotary body.

According to the invention, in this way a simple, compact sealing device is created which is easy to produce and is guided efficiently by the spindle.

The position of the sealing device substantially depends only on contact surfaces with the spindle. The seal of the spindle is in this way protected from all lateral loads which are provoked by lateral displacements with small amplitude of the rotary body.

The seal of the spindle in particular is protected if this is exposed to an asymmetric thrust generated by a fluid or medium inside the housing. Such a thrust may be provoked during normal use of the valve.

The protection exists because the sealing device is substantially only in contact with the spindle in movable fashion.

With regard to its tightness, according to the invention, the valve is also protected against the consequences of incorrect orientation of a control element. According to the invention, the valve is protected from effects which are caused by use of an asymmetric lever or by alternating loads. Such loads may be generated by an earthquake or by vibrations caused by vehicle carrying the valve. Such a vehicle may for example be a tanker which is moved either on the road or on rails.

The sealing device could have a fixed sealing portion and a dynamic sealing portion, wherein the dynamic sealing portion receives in sealing fashion the circumferential face of the spindle and is movable relative to the fixed sealing portion. The relative movability is restricted in particular to micro-movements of the spindle and rotary body. The fixed sealing portion, which is preferably substantially formed by membranes, functions as a type of bellows. The dynamic sealing portion is preferably formed so as to be cylindrical and/or collar-like. The dynamic sealing portion executes no rotary movement following the movement of the spindle.

The sealing device may have a first anti-extrusion ring and/or guide ring and a second anti-extrusion ring and/or guide ring which is axially spaced from the first, wherein the two anti-extrusion rings and/or guide rings receive the outer circumferential face of the spindle inside the cover. The sealing device is guided exclusively by the spindle which acts on the anti-extrusion rings without operational play.

Several rings or cords with V-shaped, rectangular and/or other shapes of cross-section may be arranged between the anti-extrusion rings and guide rings respectively. The anti-extrusion rings provide extrusion protection for the rings or cords with V-shaped, rectangular and/or other shapes of cross-section. These rings or cords are stacked and/or encapsulated between the anti-extrusion rings. The rings or cords with V-shaped or other shapes of cross-section may be made of plastic or graphite, preferably they are made of polytetrafluoroethylene (PTFE) or graphite.

A spring device may act at least on a gland ring, and/or a spring device may lie in sprung fashion on a gland ring, wherein the spring device rests directly or indirectly against the cover and/or against a compression ring. In this way, the rings with V-shaped cross-section, or rings or cords with other shapes, are held under permanent tension. Preferably, the gland ring is made of metal. Further preferably, the spring device has spring washers.

The sealing device may have a first compression ring and a second compression ring, wherein several sealing components are received axially between the compression rings. The sealing components are preferably under the spring tension of a spring device. A force acting on a compression ring may be suitably diverted.

For static sealing, the sealing device may comprise at least one membrane which is arranged between the cover and the housing. This protects the outside or environment from escaping media. Furthermore, a tightness of the valve is ensured independently of the tightness of the rotary body. It is also conceivable to use several, in particular metal, membranes connected together.

The membrane may be connected to a first compression ring. This simplifies mounting since the membrane is captively connected to the compression ring. The membrane is preferably made of metal and welded to the compression ring. However, another fully sealed connection is also possible. A membrane bundle may also be welded or connected to the compression ring in a fully sealed fashion. It is also conceivable that the membrane is welded or connected to the housing or cover.

As well as the first membrane, a further membrane made of a polymer or of polytetrafluoroethylene is provided, which lies on the first membrane and is arranged between the cover and the housing. This improves the seal.

As well as the first membrane, a body seal may be provided which lies on the first membrane and is arranged between the cover and the housing. This further improves the seal, namely virtually doubles this, since the body seal achieves the tightness from inside to outside and vice versa. The body seal is preferably received in the housing by form fit and/or force fit. The seal against the atmosphere is also guaranteed by the body seal, over which preferably lies a membrane made of metal.

The sealing device could have security means for sealing the valve. The security means ensure that in the event of possible failure of a first shut-off element, a qualified operator may seal the valve without adversely affecting the kinematics described.

The valve described here may be designed as a tap clock, a ball valve or other valve in which the sealing device described here can suitably be used as a floating sealing device.

A valve to this extent means any shut-off device which can be equipped with a floating sealing device of the type described here. Such valves may for example be designed as tap cocks, flap valves or ball cocks.

DETAILED DESCRIPTION OF THE PREFERRED EMBODIMENTS

Figure 1:
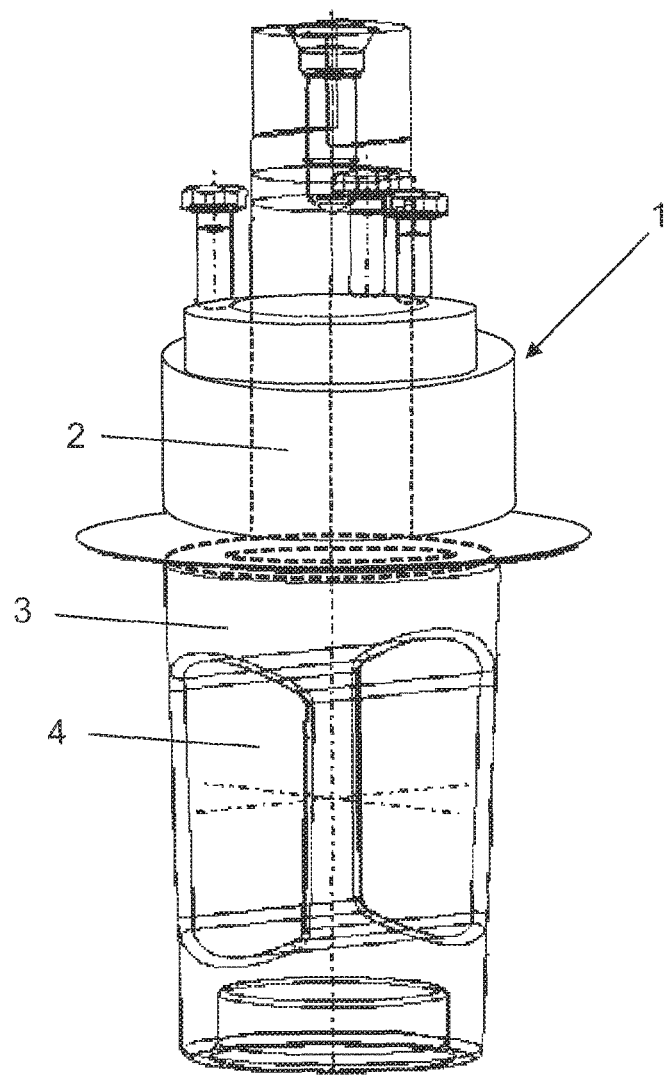
FIG. 1 a perspective view of a conical rotary body which is connected to a spindle, wherein the spindle is surrounded by a sealing device, FIG. 2 a sectional view of the upper part of a valve which has a housing, and a sectional view of the sealing device from FIG. 1, wherein arrows depict a force flow which is independent of the position of the rotary body, housing and cover, FIG. 3 a sectional view of the upper part of a valve which has a housing and a cover, and a sectional view of the sealing device from FIG. 1, FIG. 4 the left lower side of the sealing device according to FIGS. 2 and 3, wherein a first anti-extrusion ring is shown, on which several V-shaped rings made of PTFE are arranged so as to form an angular collar, FIG. 5 a perspective view of the first lower compression ring with a metallic membrane which is impenetrably connected to the compression ring, and FIG. 6 a depiction of a further sealing device, wherein security means for sealing the valve are shown, wherein a sectional view of the upper part of the valve is shown which has a housing and a cover, and wherein a detail view of the sectional view of the sealing device is shown.

FIG. 1 shows a floating sealing device 1 for a spindle 2, which allows a significant improvement in the tightness against the atmosphere.

The sealing device 1 is guided exclusively by the spindle 2. This achieves as high a tightness as possible, in order to meet the high standards relating to uncontrolled emissions without intervention in the sealing device 1 in a reference period.

A reference period here is a time period during which no access takes place to the sealing device 1. During such a period, the user expects no maintenance to be required.

The spindle 2 is configured integrally with a rotary body 3 in which a passage opening 4 for a fluid is formed.

Figure 2:
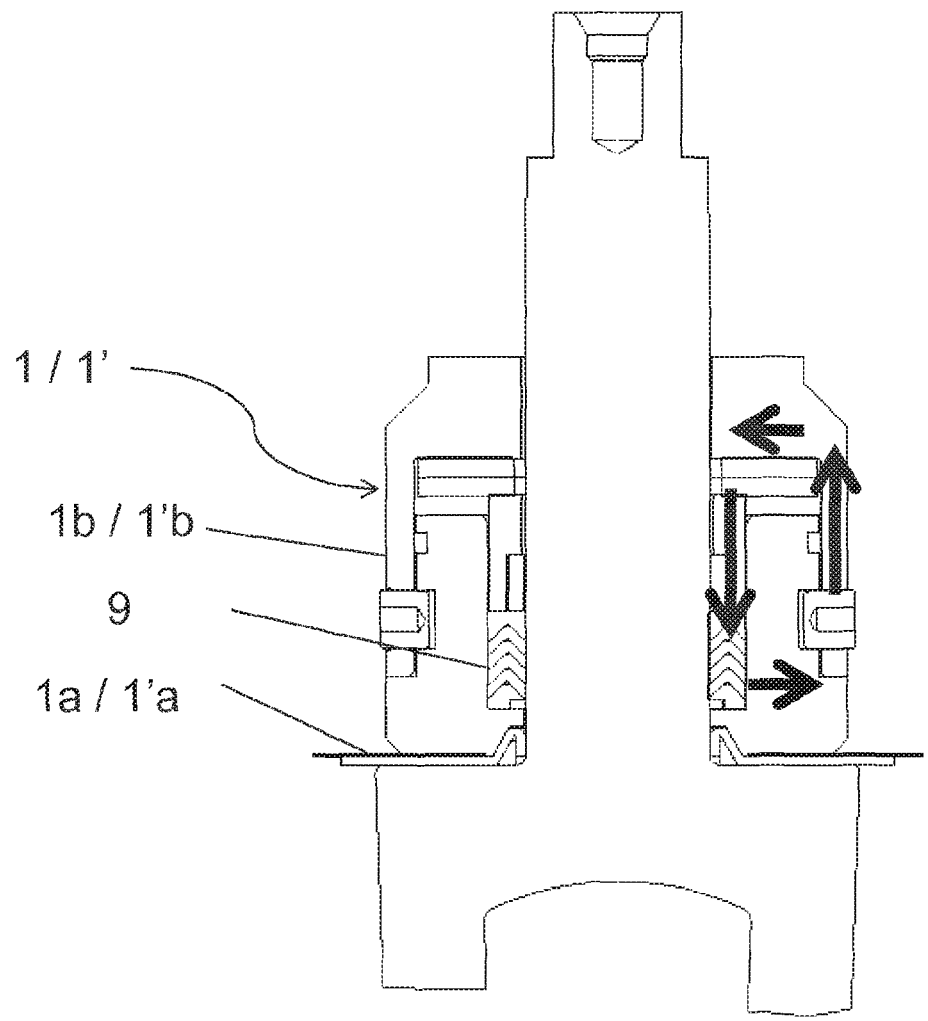
Figure 3:
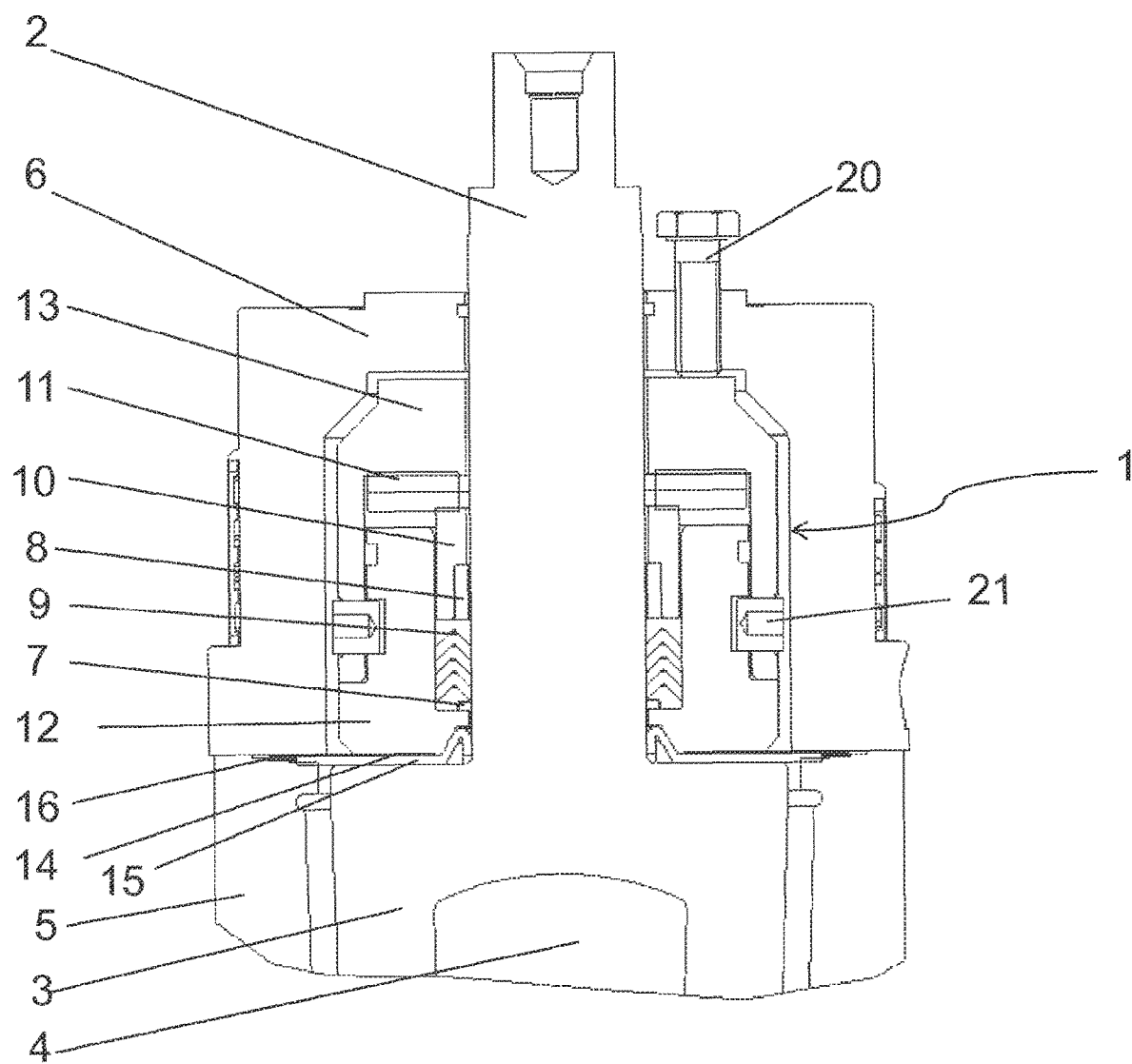

FIGS. 2 and 3 show a partial sectional view of a valve comprising a housing 5 and a rotary body 3 arranged rotatably therein, with a passage opening 4 for a fluid. A flow path is shut off or at least partly opened according to the rotational angular position of the rotary body 3 about a rotation axis (not shown). The rotary body 3 is connected to a spindle 2 by means of which the rotary body 3 can be rotated. The housing 5 is provided with a cover 6. The spindle 2 extends through the cover 6.

The spindle 2 is integral with and made of the same material as the rotary body 3. It is however also conceivable that the spindle 2 and the rotary body 3 are not formed integrally and/or not of the same material. A structural separation of the spindle 2 and rotary body 3 is conceivable. The rotary body 3 is formed so as to be conical, namely as a conical plug.

The spindle 2 is dynamically sealed by a sealing device 1 which follows movements of the spindle 2 relative to the housing 5 and/or to the cover 6.

FIG. 2 shows that the sealing device 1, 1' has a fixed sealing portion 1a, 1'a and a dynamic sealing portion 1b, 1'b, wherein the dynamic sealing portion 1b, 1'b receives the circumferential face of the spindle 2 in sealed fashion and is movable relative to the fixed sealing portion 1a, 1'a. The fixed sealing portion 1a, 1'a is formed by membranes described below.

The sealing device 1 has a first anti-extrusion ring 7 which functions less as a guide ring, and a second anti-extrusion ring 8 which is axially spaced from the first and functions more as a guide ring, wherein the two anti-extrusion rings 7, 8 receive the outer circumferential face of the spindle 2 inside the cover 6. The spindle 2 acts on the two anti-extrusion rings 7, 8. The anti-extrusion rings 7, 8 have a guide function. The spindle 2 itself has no operational play.

Several rings 9 of V-shaped cross-section are arranged between the anti-extrusion rings 7, 8. These give extrusion protection for the rings 9 of V-shaped cross-section, which are encapsulated because of the structural arrangement of the spindle 2 and the anti-extrusion rings 7, 8. The rings 9 of V-shaped cross-section are made of polytetrafluoroethylene (PTFE), but may also be made of graphite. The rings 9 of V-shaped cross-section are encapsulated in a ring chamber.

The first anti-extrusion ring 7, as well as the guide function, above all has the function of preventing an extrusion of the rings 9 through a gap. The first anti-extrusion ring 7 may however also not provide any guide function, but merely deploy an anti-extrusion function and be configured only as an anti-extrusion ring.

A spring device 11 acts at least on a gland ring 10. The spring device 11 lies under spring force on the gland ring 10, wherein the spring device 11 rests against a second compression ring 13. An indirect support is also conceivable. The rings 9 of V-shaped cross-section are to this extent connected to a ring guide. The rings 9 of the V-shaped cross-section are held under permanent tension by several spring washers of the spring device 11, wherein the spring washers act on the metallic gland ring 10.

The gland ring 10 may be designed in two pieces. This allows a reduction in effects attributable to expansion phenomena. Such phenomena may be provoked by temperature cycles occurring in any case because of the use of differently tempered media or in specific processes. Many processes have different temperature cycles when the media used in the processes are brought to different temperatures.

Stresses are deflected radially. The force which is exerted on the second compression ring 13 by the spring device 11 is deflected by the structure onto the first compression ring 12. This eliminates all effects on the other components which guarantee an internal tightness.

FIG. 2 shows a mainly diagrammatic view to depict the force flow.

Figure 4:
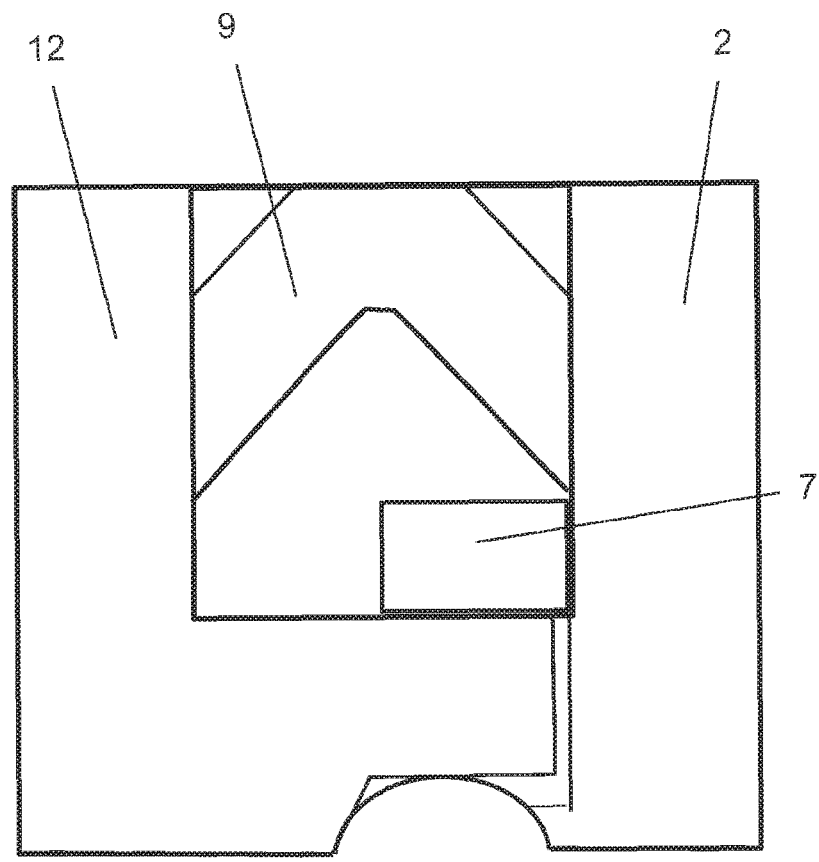

FIGS. 2 and 3 show in detail that the sealing device has a first compression ring 12 and a second compression ring 13, wherein several sealing components are received between the compression rings 12 and 13. FIG. 4 shows detail views of the sealing components.

For static sealing, the sealing device 1 may comprise at least one membrane 14 which is arranged between the cover 6 and the housing 5. Several membranes 14 may be secured metallically between the cover 6 and the housing 5.

Figure 5:
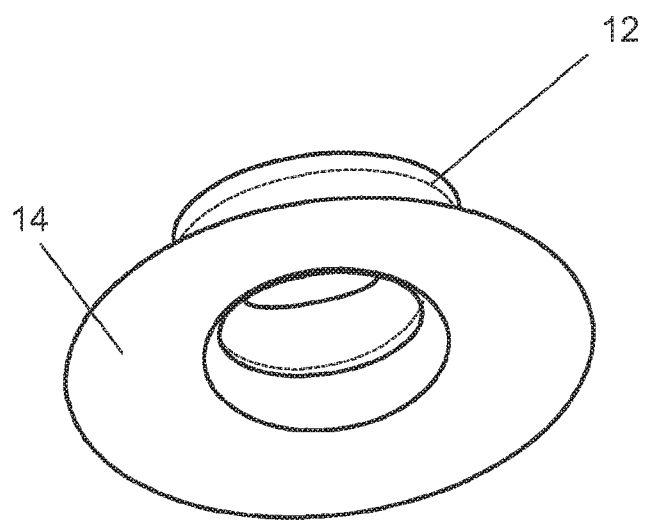

FIG. 5 shows that the membrane 14 is connected to the first compression ring 12, namely welded thereto. Other impenetrable connections between the membrane 14 and first compression ring 12 are however also conceivable with respect to FIG. 5.

Figure 6:
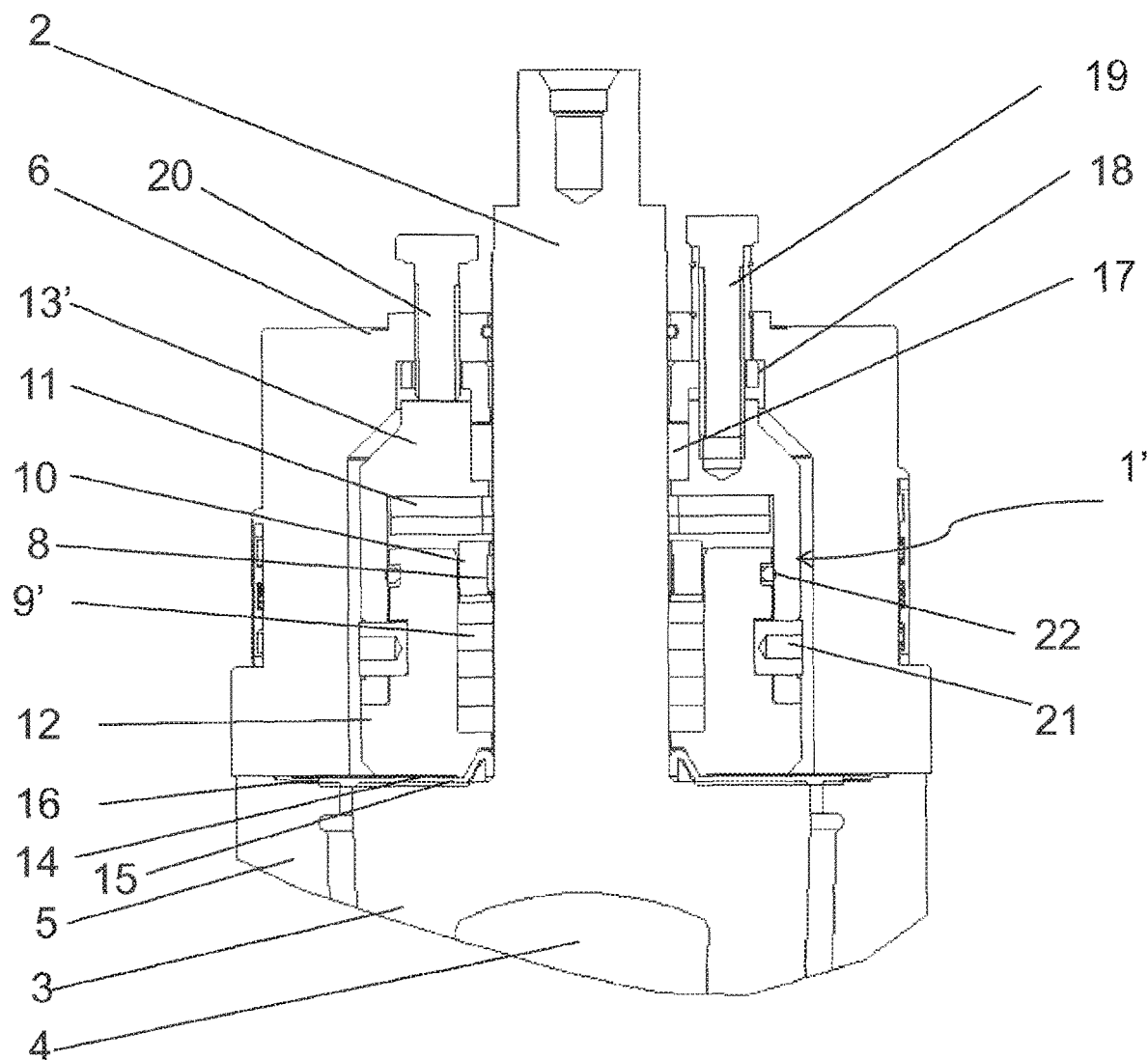

FIGS. 3 and 6 show that, as well as the first membranes 14, a further membrane 15 is provided which is made of a polymer, lies on a first membrane 14 and is arranged between the cover 6 and the housing 5. The further membrane 15 lies directly on the housing 5.

The further membrane 15 is made of a polymer, in particular PTFE or PTFE compounds, and has a sealing effect which is doubled by a body seal 16 which guarantees the tightness in two directions, namely from inside to outside and vice versa.

The body seal 16 is preferably formed as a flat seal which, in a first radially outer zone, is compressed between the cover 6 and housing 5 and, in a second radially inner zone, is compressed between the membrane 14 and the housing 5.

The sealing effect described above is increased by the use of the second compression ring 13.

FIG. 6 shows that an alternative sealing device 1' comprises security means for sealing the valve.

For this, the second compression ring 13' has a reinforcing sealing ring 17 or a packing which may be sealed by a gland 18. The gland 18 is moved by a control element 19. The control element 19 is accessible to a user in an emergency. This device is independent of the cover 6 and may follow adaptation movements of the spindle 2 and rotary body 3, in particular downward movements.

An inner seal, in particular an O-ring 22, guarantees the tightness between the second compression ring 13' and the first compression ring 12. In the event of failure of the rings 9', it is necessary to seal a cavity which lies below the reinforcing sealing ring 17 or the packing that can be actuated manually.

Although FIG. 6 shows alternative rings 9' of rectangular cross-section; however, in a similar fashion to FIG. 2, it is also conceivable to arrange the rings 9 shown in FIG. 3 next to anti-extrusion rings 7, 8.

FIGS. 3 and 6 furthermore show a security pin 21 which ensures that the sealing components arranged between the compression rings 12, 13, 13' remain pressed together.

FIGS. 3 and 6 furthermore show that at least one adjustment element 20 may be provided for displacing the rotary body 3, in particular axially. In detail, three screw-like adjustment elements 20 are provided in order to create the inner tightness of the valve by downward movements of the spindle 2 and rotary body 3. These adaptation movements or downward movements are preferably oriented axially.

LIST OF REFERENCE SIGNS 1, 1' Sealing device
2 Spindle for rotary body
3 Rotary body
4 Passage opening
5 Housing
6 Cover
7 First lower anti-extrusion ring or guide ring
8 Second upper anti-extrusion ring or guide ring
9 Ring of V-shaped cross-section of an angular collar
9' Rings
10 Gland ring
11 Spring device 12 First lower compression ring
13, 13' Second upper compression ring
14 Metallic membrane
15 Further membrane made of PTFE
16 Body seal
17 Reinforcing sealing ring or packing
18 Gland
19 Control element to reinforce seal
20 Adjustment element
21 Security pin
22 Inner seal or O-ring

The invention claimed is:

1. A valve, comprising a housing and a rotary body arranged rotatably therein, with a passage opening for a fluid,
wherein a flow path is shut off or at least partially opened according to the rotational angular position of the rotary body about a rotation axis;
wherein the rotary body is connected to a spindle by means of which the rotary body can be rotated;
wherein the housing is provided with a cover; and
wherein the spindle extends through the cover;
wherein the spindle is dynamically sealed by a sealing device which follows movements of the spindle relative to the housing and to the cover;
wherein the sealing device has a first compression ring and a second compression ring;
wherein several sealing components are received axially between the compression rings; and
wherein the sealing device houses the sealing components inside the sealing device under spring tension of a spring device inside the sealing device; and wherein the first and second compression rings are connected to ensure that the sealing components arranged between the first and second compression rings remain pressed together.

2. The valve as claimed in claim 1, wherein the sealing device has a fixed sealing portion and a dynamic sealing portion, wherein the dynamic sealing portion receives in sealing fashion the circumferential face of the spindle and is movable relative to the fixed sealing portion.

3. The valve as claimed in claim 1, wherein the sealing device has a first anti-extrusion ring and a second anti-extrusion ring which is axially spaced from the first, wherein the two anti-extrusion rings receive the outer circumferential face of the spindle.

4. The valve as claimed in claim 3, wherein several rings or cords with V-shaped, rectangular and/or other shapes of cross-section are arranged between the anti-extrusion rings.

5. The valve as claimed in claim 1, wherein a spring device acts at least on a gland ring, and/or wherein a spring device lies in sprung fashion on a gland ring, wherein the spring device rests directly or indirectly against the cover and/or against the second compression ring.

6. The valve as claimed in claim 1, wherein for static sealing, the sealing device comprises at least one membrane which is arranged between the cover and the housing.

7. The valve as claimed in claim 6, wherein the membrane is connected to the first compression ring.

8. The valve as claimed in claim 6, wherein as well as the first membrane, a further membrane made of a polymer or of polytetrafluoroethylene is provided which lies on the first membrane and is arranged between the cover and the housing.

9. The valve as claimed in claim 6, wherein as well as the first membrane, a body seal is provided which lies on the first membrane and is arranged between the cover and the housing.

10. The valve as claimed in claim 1, wherein the second compression ring has a reinforcing sealing ring or a packing sealable by a gland, wherein the gland is movable by a control element for sealing the valve.

* * * * *